United States Patent [19]

Juengel

[11] Patent Number: 4,578,874
[45] Date of Patent: * Apr. 1, 1986

[54] PROBER WITH OPTICAL TRANSMISSION SCHEME

[75] Inventor: Richard O. Juengel, Romeo, Mich.

[73] Assignee: GTE Valeron Corporation, Troy, Mich.

[ * ] Notice: The portion of the term of this patent subsequent to Aug. 30, 2000 has been disclaimed.

[21] Appl. No.: 478,906

[22] Filed: Mar. 25, 1983

Related U.S. Application Data

[63] Continuation-in-part of Ser. No. 259,257, Apr. 30, 1981, Pat. No. 4,401,945.

[51] Int. Cl.<sup>4</sup> ............... A61B 5/10; B23F 23/08; H01H 1/06
[52] U.S. Cl. .................... 33/561; 200/275; 331/65; 340/652; 340/686
[58] Field of Search ............... 324/207, 208, 228, 233, 324/81, 236-240; 318/16; 33/133 E, 174 L, 172 L, 174 PC; 219/124.4; 331/65; 340/652; 361/179

[56] References Cited

U.S. PATENT DOCUMENTS

| | | | |
|---|---|---|---|
| Re. 30,975 | 6/1982 | Stobbe et al. | 33/174 |
| 3,488,586 | 6/1970 | Watrous et al. | 321/96 |
| 3,670,243 | 6/1972 | Fougere et al. | 324/57 |
| 3,783,340 | 1/1974 | Becker | 361/50 |
| 3,795,054 | 3/1974 | Kinney | 33/174 PC |
| 3,962,911 | 6/1976 | Grenlund | 73/88.5 |
| 4,118,871 | 10/1978 | Kirkham | 33/174 PC |
| 4,119,948 | 10/1978 | Ward et al. | 340/151 |
| 4,130,941 | 12/1978 | Amsbury | 33/174 |
| 4,150,284 | 4/1979 | Trenkler et al. | 250/199 |
| 4,153,998 | 5/1979 | McMurtry | 33/174 L |
| 4,197,530 | 4/1980 | Laue | 340/602 |
| 4,222,880 | 9/1980 | Baur et al. | 455/617 |
| 4,259,746 | 3/1981 | Sandstedt | 455/600 |
| 4,328,623 | 5/1982 | Juengel et al. | 33/174 L |
| 4,330,870 | 5/1982 | Arends | 455/617 |
| 4,339,714 | 7/1982 | Ellis | 324/207 |
| 4,401,945 | 8/1983 | Juengel | 324/207 |
| 4,443,946 | 4/1984 | McMurtry | 33/174 L |
| 4,451,987 | 6/1984 | Cusack | 33/174 L |

FOREIGN PATENT DOCUMENTS

| | | |
|---|---|---|
| 1128132 | 7/1982 | Canada . |
| 413808 | 6/1980 | Sweden . |
| 2007355 | 5/1979 | United Kingdom . |

OTHER PUBLICATIONS

Collingwood, "Prototype Performance Specification" Oct. 19, 1981, pp. 1–24.
Renishaw, "LP2 Probe System for CNC Turning Centres", 1981, pp. 1–2.
BIG "Zero-Senser for Machining Centers" 1982, pp. 1–6.
"Data-Input Link Goes Infrared for Process-Control Applications", *Electronics*, Dec. 20, 1979, pp. 60 and 62.
Renishaw brochure, "Optical Transmission for Touch Trigger Probes", Aug. 1981.

*Primary Examiner*—Reinhard J. Eisenzopf
*Assistant Examiner*—Warren S. Edmonds
*Attorney, Agent, or Firm*—Harness, Dickey & Pierce

[57] ABSTRACT

Apparatus for detecting the position of a probe relative to a workpiece, for example probe contact with the workpiece, is disclosed. The apparatus includes a transducer for converting probe contact to an electrical signal and a plurality of light emitting semiconductors for wirelessly transmitting an indication of the occurrence of the signal via infrared radiation. The apparatus is particularly suitable for operation with a mechanical switch type probe transducer. The apparatus is easily adapted to transmit the occurrence of probe contact by either amplitude modulation or frequency modulation of the emitted infrared radiation.

25 Claims, 2 Drawing Figures

PROBER WITH OPTICAL TRANSMISSION SCHEME

BACKGROUND OF THE INVENTION

RELATED APPLICATIONS

This is a continuation-in-part of Ser. No. 259,257, now U.S. Pat. No. 4,401,945 filed Apr. 30, 1981 and assigned to the same assignee as the instant invention.

FIELD OF THE INVENTION

The invention generally relates to position detection apparatus for use in measuring and gaging systems. More particularly the invention concerns probe contact detection apparatus for providing an indication of probe contact with a workpiece.

DESCRIPTION OF THE PRIOR ART

A known touch probe operates by arranging the probe stylus to severely attenuate a radio frequency signal upon contact of the probe stylus with a metallic workpiece. One such prior art device is taught in U.S. Pat. No. 4,118,871—Kirkham. Such arrangements are prone to electromagnetic noise interference with the radiated radio frequency signal, and this interference can lead to false indications of probe contact with a workpiece.

Also related to this invention is that prior art concerned with wireless transmission of dimensional gaging data such as disclosed in U.S. Pat. No. 3,670,243—Fougere et al., U.S. Pat. No. 4,130,941—Amsbury, and U.S. Pat. No. 4,328,623 assigned to the same assignee as the instant invention.

A need has arisen for touch detection apparatus with high resolution and immunity to electromagnetic noise, capable of wireless transmission of an indication of the occurrence of probe contact with a workpiece. A need also has been demonstrated for touch detection apparatus with the added capability of accepting a variety of position determining transducers. One such approach to fulfilling this need is disclosed in my co-pending application Ser. No. 259,257, now U.S. Pat. No. 4,401,945 referenced above, wherein either a current transformer or a mechanical switch type transducer is used in conjunction with a voltage controlled oscillator to produce frequency modulated infra-red signals whenever the probe assumes a preselected position relative to a workpiece.

SUMMARY OF THE INVENTION

It is therefore an object of this invention to provide improved detection apparatus for indicating a preselected position of a probe relative to a workpiece, such apparatus being capable of overcoming the above problems with related prior art devices.

A position detection probe is provided with apparatus for converting a signal generated by a probe transducer to an optically transmitted signal indicative of the probe position relative to a workpiece. The optical indication may be transmitted using either amplitude or frequency modulation of an optical (preferably infra-red) carrier signal. The modulation is effected upon a carrier signal initially generated by a crystal controlled oscillator whose output is coupled to a programmable divider. In the frequency modulation mode, the divider output, which is coupled to an LED source of infrared radiation, is changed in accordance with the state of the transducer switch. In the amplitude modulation mode, the output of the divider is prevented from reaching the optical source by logic gating whenever the transducer switch state indicates that the probe stylus or contact surface has assumed the preselected position.

DRAWING

The invention will be more clearly understood from a reading of a detailed description of a preferred embodiment, taken in conjunction with the drawing, in which:

FIG. 1 is a schematic diagram of position detection apparatus arranged in accordance with the principles of the invention; and FIG. 2 is a perspective view of a housing for a probe and position determining apparatus therefor, suitable for use in accordance with the principles of the invention.

DETAILED DESCRIPTION

Figure 1:
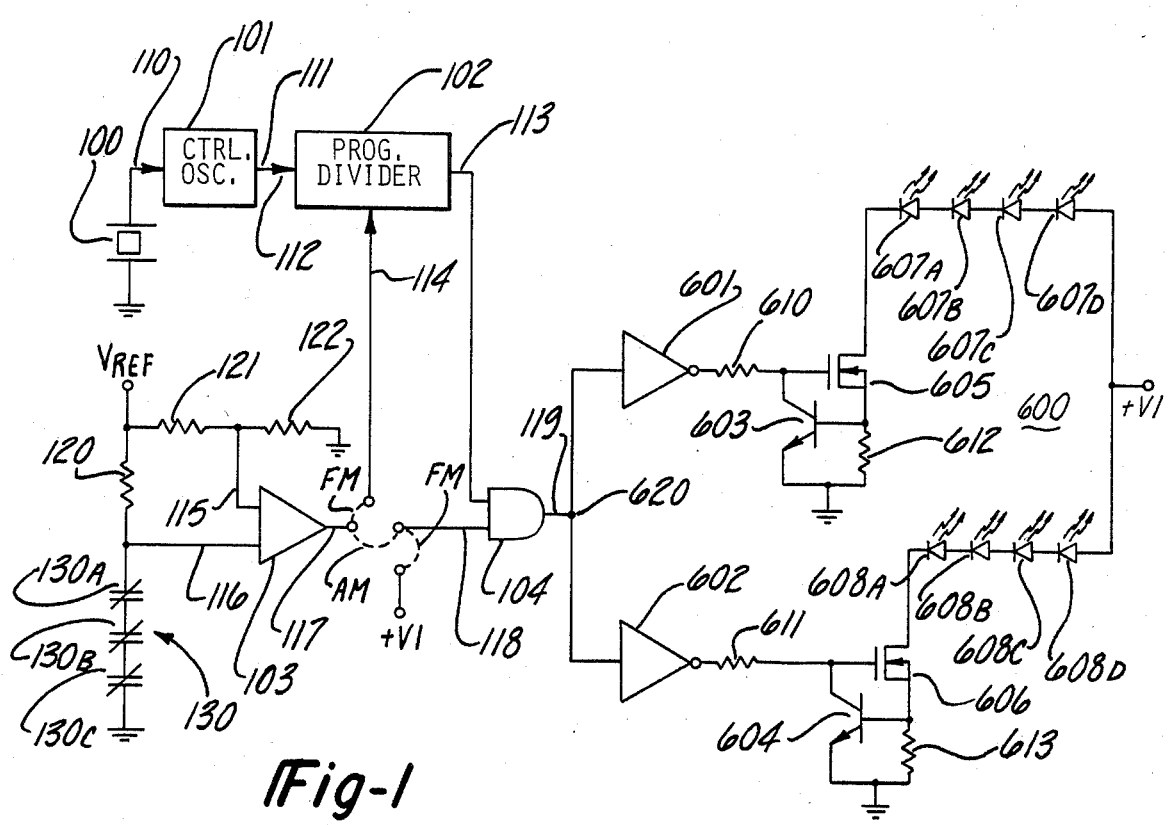

With reference to FIG. 1, a preferred embodiment for the circuitry employed to effect the invention is shown. A quartz crystal 100 is coupled between reference ground potential and an input 110 of controlled oscillator 101. Crystal 100 may be selected from a variety of commercially available (e.g. from International Crystal Manufacturing Co.) components to provide a preselected reference frequency source. Element 101 is a type MC 4001 (Motorola) gate configured as an oscillator.

Output 111 of controlled oscillator 101 is coupled to input 112 of programmable divider 102, which may be comprised of a Motorola type MC 4526 divider. Output 113 of divider 102 is coupled to a first input of logic AND gate 104.

A reference potential source $V_{REF}$ is coupled via resistor 121 to input 115 of comparator 103 and to input 116 of comparator 103 via resistor 120. Comparator 103 could, for example, comprise type LM 2903, commercially available from National Semiconductor. Input 115 of comparator 103 is additionally coupled to reference ground potential via resistor 122, while comparator input 116 is additionally coupled to a first end of a serial connection of three normally closed contacts 130A, 130B, and 130C of a mechanical switch type transducer 130. A second end of the serial connection is coupled to reference ground potential.

With contacts 130A, 130B and 130C electrically coupled in a series circuit as shown in FIG. 1, any contact beginning to open will cause the voltage seen at comparator input 116 to approach that voltage appearing at comparator input 115 thereby causing an indication of the contact movement at output 117 of comparator 103. A contact need not fully open to generate an output at 117, but need only begin to show increasing electrical impedance.

Figure 2:
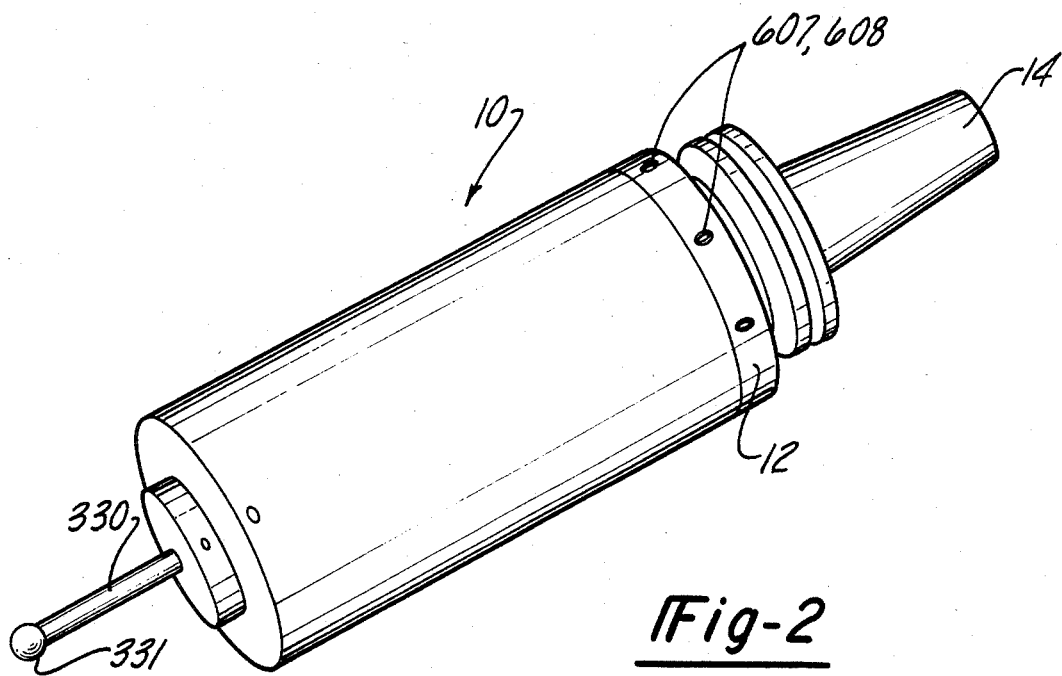

Contacts 130A, 130B and 130C are mechanically arranged so as to reflect the movement of a probe stylus, or other probe contact type surface, such as contact element 331 of stylus 330 of FIG. 2. This mechanical arrangement is not specifcically shown herein, but such arrangements are known to those skilled in the art and are disclosed, for example, in U.S. Pat. No. 4,138,823—McMurtry or U.S. Pat. No. 4,153,998—McMurtry. A more recent particularly advantageous mechanical arrangement suitable for use with contacts 130A, 130B and 130C is disclosed in a pending U.S. application Ser. No. 388,187 by Cusack, now U.S. Pat.

No. 4,451,987 filed June 14, 1982 and assigned to the same assignee as the instant invention.

Returning to FIG. 1, the indication signal at comparator output 117 is utilized to alter the programmable divider output as seen at output 119 of AND gate 104 in one of two ways, depending upon whether amplitude or frequency modulation is to be used with the transmitted optical output signal of the position detection probe of the invention.

When using the probe with frequency modulation, jumpers FM are employed to couple the comparator output 117 to a frequency determining input 114 of programmable divider 102 and to couple a reference source +V1, representing the logic ONE or TRUE state, to input 118 of AND gate 104.

When the probe apparatus is used with amplitude modulation, jumper AM is connected as shown and jumper FM removed, thereby coupling comparator output 117 to AND gate input 118 and leaving frequency determining input 114 unconnected. As will be apparent to those skilled in the art, input 114 of divider 102 may be required to be grounded to prevent damage to the divider in the AM mode rather than simply left open circuited, especially where divider 102 is comprised of a MOSFET type integrated circuit device. One approach which would avoid option jumper strapping, would be to permanently tie input 114 to ground via a relatively high valued resistor. Also apparent to those skilled in the art, divider 102 could be removed in the AM option, with the output of a suitably driven oscillator 101 coupled directly to AND gate 104.

The control input to LED array 600 is coupled to the output 119 of a modulator comprising divider 102 and AND gate 104 at node 620 and is then coupled to inputs of inverters 601 and 602.

An output of inverter 601 is coupled via resistor 610 to a gate electrode of MOSFET 605. The gate electrode of MOSFET 605 is also coupled to a collector electrode of gate drive current regulating NPN transistor 603, whose emitter electrode is coupled to ground potential. A base electrode of transistor 603 is coupled to a source electrode of MOSFET 605 and to a first terminal of drive current sensing resistor 612. A second terminal of resistor 612 is coupled to ground potential. A drain electrode of MOSFET 605 is coupled to a cathode electrode of infrared light emitting diode 607A, which is series connected with three additional LED's 607B-D. An anode electrode of 607D is coupled to DC souce V1. Transistor 603 is utilized as configured to maintain a substantially constant drive current via MOSFET 605 to light emitting diodes 607A-D at an optimum operating level for such diodes.

Circuitry identical to that described above in conjunction with MOSFET 605 is coupled between an output of inverter 602 and four serially connected infrared LEDs 608A-D. It will be apparent therefore, that node 620 may be multipled to as many inverter inputs as necessary to provide a desired total number of light emitting diodes, driven in serially connected groups of four.

With reference to FIG. 2, housing 10 for a probe, such as probe stylus 330 of FIG. 2, is shown in perspective. Housing 10 contains all the apparatus described above in conjunction with FIG. 1. The infra-red LED's of FIG. 1 are shown at 607, 608 of FIG. 2 as a circular array, mounted to substantially cylindrical exterior housing surface 12, and capable of emitting infrared radiation in a full 360 degree pattern. At an end of housing 10 opposite the probe mounting end, a suitable adaptor 14 is provided. The adaptor 14 shown in FIG. 2 allows housing 10 to be incorporated into an NC machining center in the same way as a typical cutting tool. Alternatively, housing 10 could be hand-held by a human operator or an appropriate housing adaptor or extension could be provided enabling use of the housing by the "hand" or gripping element of an automaton, such as an industrial robot.

Elongate stylus 330 may be equipped at its end contacting terminus with a suitably shaped contact element 331. One commonly useful shape is a spherical surface. Element 331 may advantageously be fashioned from a wear resistant material, such as cemented carbide. Stylus 330 is coupled to a follower element, or wobble plate, within housing 10 in a manner described in the above referenced pending application Ser. No. 388,187, now U.S. Pat. No. 4,451,987.

With the components of the position detection apparatus arranged as described above, the general operation in the frequency modulation mode is as follows. A suitable quartz crystal is chosen to provide the base frequency for controlled oscillator 101. In the rest state, with no probe contact indication from comparator 103, a carrier frequency is derived from the output of programmable divider 102 and coupled to optical source 600 via AND gate 119. The preferred range of output frequency from divider 102 is 150 kHz to 500 kHz, which will provide an infrared signal having a frequency high enough to be easily distinguishable from background light source noise, yet low enough to be used efficiently with commercially available light-emitting diodes 607, 608 and PIN diodes at the remote receiver (not shown). Divider 102 divides the input signal frequency at input 112 by a first number, e.g. 12, when no indication signal is present at frequency determining input 114, and by a second number, e.g. 13, whenever the indicator signal indicative of probe contact is presented to input 114 by comparator output 117 and an FM jumper connected as shown in FIG. 1. The other FM jumper in FIG. 1 will maintain AND gate 104 in the enabled state to pass a signal having one of two frequencies determined by divider 102 to the input of optical source 600.

Operation of the probe apparatus in the AM mode of FIG. 1 is as follows. Divider 102 will pass a carrier of a fixed frequency, since no connection in this mode is made to frequency determining input 114. Hence, when no indicator signal is present at comparator output 117, AND gate 104 will be disabled thereby cutting off the carrier signal from optical source 600. Whenever the probe stylus assumes the position relative a workpiece to be detected, AND gate 104 will be enabled by comparator output 117 to pass the carrier signal through the source 600. If the opposite signaling convention is desired, i.e. to provide carrier except when the probe stylus assumes the detectable position, then a logical invertor, or NOT gate, could be coupled between comparator output 117 and input 118 of AND gate 104.

It should be noted that the invention described herein has been illustrated with reference to a preferred embodiment. It is to be understood that many details used to facilitate the description of such an embodiment are chosen for convenience only and without limitation on the scope of the invention as set forth in the appended claims.

I claim:

1. Apparatus for detecting a position of a probe relative to an object comprising:
- a probe body surface whose position relative to an object is to be detected;
- oscillator means for providing a reference alternating current signal having a preselected frequency at an output thereof;
- transducer means including means coupled to the probe body surface so as to exhibit a change in electrical characteristic whenever the probe body surface assumes said position, and detector means coupled to the means coupled to the probe body surface, operative to generate an indicator signal at a transducer means output indicative of said characteristic change;
- modulator means having a first input coupled to the oscillator means output and a second input coupled to the transducer means output, operative to alter the reference alternating current signal and to present the altered signal at a modulator means output whenever the indicator signal is generated; and
- a source of optical radiation having a control input coupled to the modulator means output, operative to emit optical radiation having a characteristic determined by the modulation means output.

2. Apparatus as set forth in claim 1 wherein the modulator means is operative to alter the frequency of the reference alternating current signal upon receipt of the indicator signal.

3. Apparatus as set forth in claim 1 wherein the modulator means is operative to alter the amplitude of the reference alternating current signal upon receipt of the indicator signal.

4. Apparatus as set forth in claim 1 wherein the transducer means further comprises first and second reference potential sources; wherein the means coupled to the probe body surface comprises a plurality of switch contacts coupled in a series circuit between the first and second potential sources; and wherein the detection means comprises a comparator having an output providing the transducer means output, said comparator having a first input coupled to the first reference potential source, and a second input coupled via the series circuit of switch contacts to the second reference potential in a manner such that signal levels at the first and second inputs to the comparator will approach substantial equality whenever any one of the switch contacts begins to exhibit an altered inpedance thereacross, thereby enabling the comparator to generate the indicator signal at its output.

5. Apparatus as set forth in claim 4 wherein the modulator means includes;
- a programmable divider having an input providing the modulator means first input for receipt of the reference alternating current signal, and a frequency determining input providing the modulator means second input for receipt of the indicator signal, operative to divide the frequency of the reference alternating current signal by a first number whenever the indicator signal is not present and by a second number whenever the indicator signal is present and to present the resultant divided frequency signal at a programmable divider output; and
- means for coupling the divider output to the modulator means output.

6. Apparatus as set forth in claim 4 wherein the modulator means comprises logic gate means having a first input coupled to the modulator means first input for receipt of the reference alternating current signal, a second input coupled to the modulator means second input for receipt of the indicator signal, and an output providing the modulator means output, the logic gate means operative to alter the amplitude of the reference alternating current signal in accordance with the status of the indicator signal and to present the altered amplitude signal at the logic means output.

7. Apparatus as set forth in claim 6 wherein the logic gate means is operative to reduce the amplitude of the reference alternating current signal to zero whenever the indicator signal is generated.

8. Apparatus as set forth in claim 6 wherein the logic gate means is operative to reduce the amplitude of the reference alternating current signal to zero whenever the indicator signal is not generated.

9. Apparatus as set forth in claim 1 wherein the emitted optical radiation is in the infrared frequency spectrum.

10. Apparatus as set forth in claim 9 further comprising:
- a housing for the apparatus having an exterior surface portion; and
- wherein the optical source includes a plurality of infrared light emitting diodes mounted at the surface portion such that infrared radiation is emitted in a preselected pattern.

11. Apparatus as set forth in claim 10 wherein the exterior surface portion is substantially cylindrical and the plurality of diodes is mounted about the cylindrical surface so as to emit infrared radiation in a substantially full circular pattern.

12. Apparatus as set forth in claim 1 further comprising an elongate stylus coupled to the transducer means at one end thereof; and wherein the probe body surface comprises a contact element coupled to a second end of the elongate stylus.

13. Apparatus as set forth in claim 1 wherein the position relative to the workpiece comprises physical contact between the probe body surface and the workpiece.

14. Touch probe apparatus for detecting contact between a probe stylus and an object comprising:
- a contact element coupled to one end of the probe stylus;
- a crystal controlled oscillator for providing a reference alternating current signal having a preselected frequency at an oscillator output;
- at least three serially connected normally closed switch contacts coupled to a second end of the stylus so as to initiate opening of at least one of the switch contacts whenever the contact element touches the object;
- a comparator having first and second inputs and an output, a reference potential coupled to the first comparator input; a voltage source coupled to one end of said serially connected switch contacts, with the other end of the switch contacts being coupled to ground potential; said one end of the switch contacts being coupled to the second comparator input whereby the resistance presented by the switch contacts increases as at least one of the contacts begins to open thereby increasing the potential at the second comparator input from essentially ground potential to a potential greater than the reference potential to thereby provide a touch indicator signal at the output of the comparator;

modulator means having a first input coupled to the crystal controlled oscillator output and a second input coupled to the comparator output, operative to alter the reference alternating current signal and to present the altered signal at a modulator means output in accordance with the status of the touch indicator signal at the second modulator means input; and a source of infrared radiation having a control input coupled to the modulator means output, operative to emit infrared radiation having a magnitude and frequency determined by the magnitude and frequency of the altered signal.

15. Apparatus as set forth in claim 14 wherein the modulator means comprises:

a programmable divider operative to divide the frequency of a signal coupled to an operand input of the divider by one of two divisors respectively determined by the presence and absence of a programming signal at a programming input of the divider and further operative to present the division result at a divider output, with the operand input coupled to the crystal controlled oscillator output and the programming input coupled to the comparator output; and means for coupling the divider output to the control input of the infrared radiation source.

16. Apparatus as set forth in claim 15 wherein the means for coupling the divider output comprises a logic AND gate having first and second inputs and an output coupled to the control input of the radiation source;

wherein frequency modulation of the reference alternating current signal is effected in a first optional configuration by coupling the comparator output to the programming input, coupling the first AND gate input to the divider output, and coupling the second AND gate input to a logic TRUE signal level so as to maintain the AND gate in an enabled state; and wherein amplitude modulation of the reference alternating current signal is effected in a second optional configuration by coupling the comparator output to the second AND gate input, disconnecting the programming input from the comparator output, and coupling the first AND gate input to the divider output.

17. Apparatus as set forth in claim 14 wherein said reference potential is developed by coupling one end of a series connection of two fixed resistors to said voltage source and coupling the other end thereof to ground potential, with the first comparator input being connected between the two resistors.

18. In an apparatus for detecting contact with an object, said apparatus including a probe having a housing and a stylus projecting from one end of the housing, the opposite end of the stylus being connected to a plurality of switch contacts exhibiting a change in electrical characteristic when the stylus contacts the object, the improvement wherein the probe further comprises:

optical transmission means including at least one selectively energizable infrared light emitting device on the housing, operative to transmit information to a remote receiver;

electrical circuit means for modulating the energization of the infrared device according to a first predetermined manner when the stylus is in a rest position, and being further operative to modulate the energization of the infrared device in a second manner when the stylus contacts the object; and whereby said modulated infrared light can be detected by a remote receiver spaced from the probe to thereby detect stylus contact with the object.

19. The improvement of claim 18 wherein said optical transmission means comprises a plurality of infra-red light emitting diodes.

20. The improvement of claim 19 wherein said probe housing includes a cylindrical portion and the light emitting diodes are mounted thereon in substantially a full circular pattern.

21. The improvement of claim 18 wherein said electrical circuit means includes:

first means for providing an alternating current signal having a preselected frequency at an output thereof;

second means coupled to the first means for altering the frequency of the signal from the first means when the probe stylus contacts the object; and means for coupling the alternating current signal to said optical transmission means whereby the optical transmission means transmits an optical signal of a first frequency when the stylus is not touching the object and transmits an optical signal of a second frequency when the stylus contacts the object.

22. The improvement of claim 18 wherein said electrical circuit means includes:

first means for providing a reference alternating current signal having a preselected frequency at an output thereof;

second means coupled to the first means, operative to change the amplitude of said reference signal at an output thereof when the stylus contacts the object; and means for coupling the output of said second means to said optical transmission means whereby said optical transmission means transmits an optical signal of a first amplitude when the stylus is not contacting the object and transmits an optical signal of a different amplitude when the stylus contacts the object.

23. The improvement of claim 22 wherein said second means includes logic gate means adapted to remove the reference signal from said optical transmission means when the stylus contacts the object so that no optical signal is transmitted during periods of stylus contact with the object.

24. A method of detecting the position of an object by using a probe having a moveable stylus, said method comprising:

inserting the probe into a machine capable of moving the probe relative to the object, said probe having a housing with at least one infrared optical transmission device located thereon and wherein the stylus projects from one end of the housing, said stylus being coupled to a plurality of switch contacts whose electrical characteristics are adapted to change when the stylus contacts an object;

using said optical transmission device to transmit an optical signal which is modulated at a first frequency to a remote receiver;

using the machine to move the probe relative to the object until the stylus contacts the object thereby creating a change in electrical characteristic of at least one of said switch contacts; and altering a characteristic of the transmitted optical signal in response to stylus contact with the object.

25. The method of claim 24 wherein the characteristic of the transmitted optical signal is its frequency and it is altered by shifting the frequency thereof.

* * * * *